J. KERTESZ.
SIGNAL.
APPLICATION FILED OCT. 10, 1913.
1,103,052.
Patented July 14, 1914.
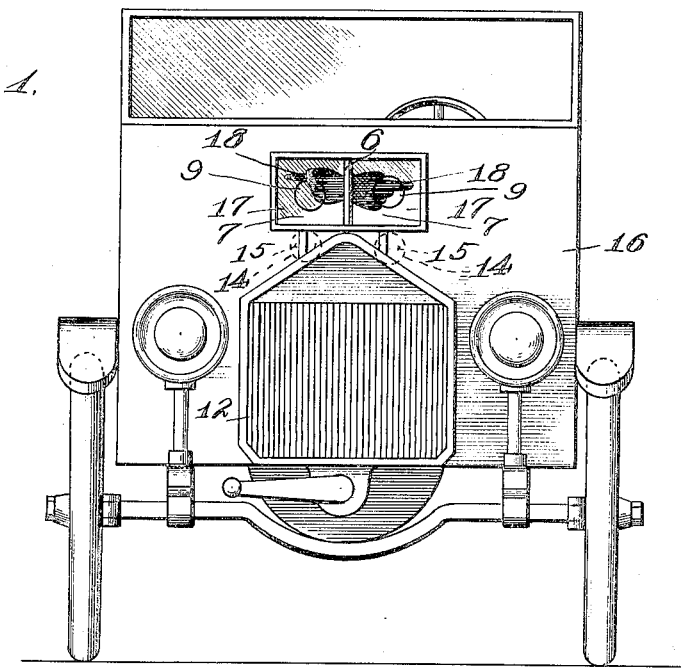
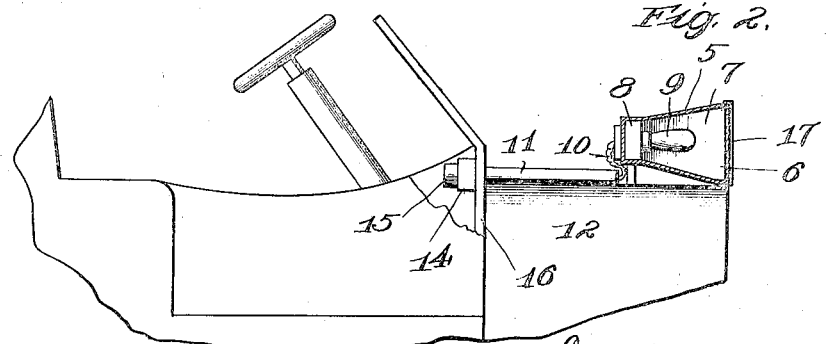
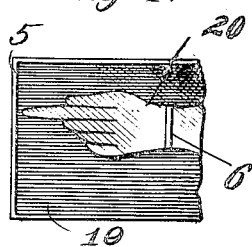
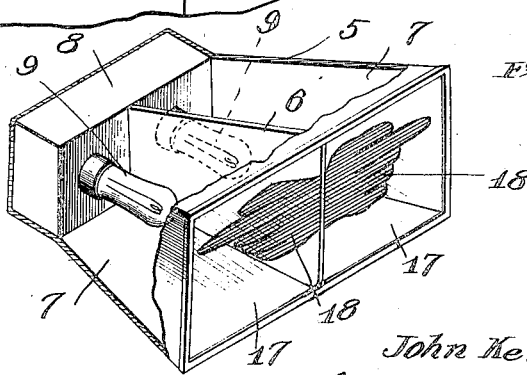
Inventor
John Kertész,
By A. M. Wilson
Attorney
Witnesses

UNITED STATES PATENT OFFICE.

JOHN KERTÉSZ, OF WOODBRIDGE, NEW JERSEY.

SIGNAL.

1,103,052.　　　　　Specification of Letters Patent.　　Patented July 14, 1914.

Application filed October 10, 1913. Serial No. 794,447.

*To all whom it may concern:*

Be it known that I, JOHN KERTESZ, a subject of the King of Hungary, residing at Woodbridge, in the county of Middlesex and State of New Jersey, have invented certain new and useful Improvements in Signals, of which the following is a specification.

This invention relates to certain new and useful improvements in signals, and relates more specifically to an indicating signal adapted for use on automobiles and like vehicles for indicating to other automobiles, vehicles, or pedestrians, the direction it is intended to take by the driver of the automobile bearing the indicating signal.

The indicating signal forming the subject matter of this invention is particularly designed to indicate to approaching automobiles, other vehicles, or pedestrians, the direction which the automobile carrying the signal intends to take, and althuogh herein shown as applied to the front of an automobile, so as to give the indication to approaching vehicles or pedestrians, yet may be readily adapted to give the indicating signal to following vehicles.

The invention comprises a suitable box or casing divided into independent compartments, in each of which is located an indicating signal, each compartment of the box or casing also having a lamp therein, preferably of the incandescent type, and which is readily controlled by the driver from his seat, so that either lamp may be lighted at will, and a signal or indication given indicating the direction which the driver intends to take.

In describing the invention in detail, reference will be had to the accompanying drawing forming a part of this specification, and wherein like numerals of reference will be employed to designate like parts throughout the different views, in which:—

Figure 1 is a view in front elevation of an automobile equipped with my improved indicating signal. Fig. 2 is a view in side elevation of an automobile partly broken away, the signal box or casing being in longitudinal section. Fig. 3 is a perspective view of the indicating signal in accordance with my invention, the box or casing being partly broken away and partly in section, and, Fig. 4 is a detail fragmentary view of a modified form of the indicating signal.

To put my invention into practice, I provide a box or casing 5, the sides, top, and bottom of which are of opaque material, preferably being constructed of sheet tin or light-weight sheet metal. This box or casing is flared, the forward end thereof being desirably considerably wider than the rear end, and the interior thereof is divided by a central partition 6, forming independent compartments 7 within such box or casing.

In the rear end of the box is a suitable lamp block or base 8, in which are mounted the incandescent lamps 9, one lamp in each compartment 7. Circuit wires 10 lead from these lamps through a pipe 11 mounted on top of the hood 12 of the automobile to switch blocks 14 of the usual type and having the usual buttons or knobs 15. These switchblocks 14 are located on the dashboard 16 of the automobile, where the buttons or knobs 15 may be easily reached by the driver or operator of the car so as to turn on or off the lights as desired.

With the construction shown in Figs. 1, 2 and 3, the front walls 17 of the compartments 7 are of transparent material as glass or the like, and directly back of these transparent ends or walls 17 is an indicating signal 18, desirably in the form of a hand with the first finger of the hands in the separate compartments pointing in opposite directions, such indicating signal being of an opaque nature.

Instead of making the entire front walls 17 transparent, I may make the same opaque as shown at 19 in Fig. 4, and make the portion 20 constituting the signal transparent, which will give the same effect as the structure shown in Figs. 1, 2, and 3.

When the driver or operator of an automobile equipped with an indicating signal as herein described approaches an intersecting street and intends to turn toward the left, he will turn the button 15 controlling the circuit to the lamp at the left hand side, which will light up that lamp and thus give notice to approaching vehicles or pedestrians as to the direction which he intends to take. Similarly, if he intends to turn toward the right at such intersecting street, he will turn the button or knob 15 controlling the lamp in the right hand compartment, so as to give the desired indicating signal. After having served their desired purpose, the lamps may be turned off until it is again desired to give a signal. It will be understood that the lamps are in circuit with a suitable source of electrical supply, the nature of which will of course depend upon the automobile equipment to which the indicating signal is applied.

What I claim as new is:—

A signal device comprising a box consisting of an opaque top and bottom, opaque side walls outwardly inclined in opposite directions, and having their top edges inclined downward from front to rear and their bottom edges inclined upward from front to rear, a longitudinal partition disposed centrally between said sides, corresponding in shape to said sides to provide two compartments flared at their front ends, said sides, top and bottom having integral rear extensions forming the rear end of the box, a lamp block supported between said extensions, lamps supported by said block, and a transparent front for the box.

In testimony whereof I affix my signature in presence of two witnesses.

JOHN KERTÉSZ.

Witnesses:
 RUSZKAI FORSET, Jr.,
 FORSET RUSZKAI, Sr.